UNITED STATES PATENT OFFICE.

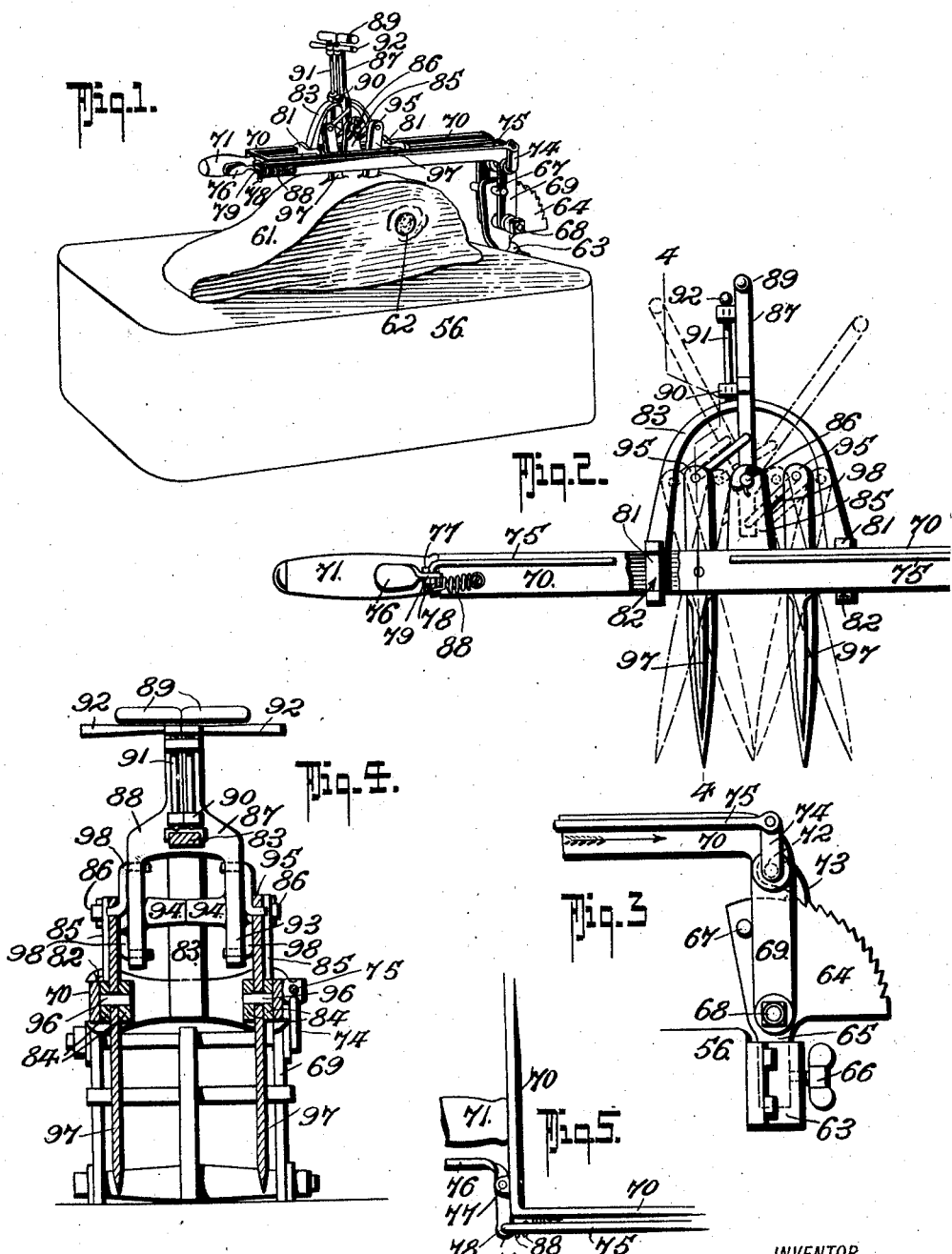

GEORGE THOMAS FRANCISCO, OF HIGHLAND, CALIFORNIA, ASSIGNOR OF ONE-HALF TO CLAUDIUS M. HILL, OF HIGHLAND, CALIFORNIA.

MEAT-CLAMPING DEVICE.

1,038,336. Specification of Letters Patent. Patented Sept. 10, 1912.

Original application filed August 4, 1911, Serial No. 642,372. Divided and this application filed January 10, 1912. Serial No. 670,425.

*To all whom it may concern:*

Be it known that I, GEORGE THOMAS FRANCISCO, residing in the city of Highland, county of San Bernardino, and State of California, have invented certain new and useful Improvements in Meat-Clamping Devices, of which the following is a specification.

The invention is an improved device for holding the meat on the block during the sawing operation, which device, in its generic nature comprises a vertically swingable frame, a gripper carried thereby for entering the meat and gripping the bone, and devices for holding the frame in its adjusted positions.

In addition to the foregoing, the invention also embodies those novel details of construction, combination and arrangement of parts, all of which will be first fully described, and then be specifically pointed out in the appended claims, reference being had to the accompanying drawings, in which:—

Figure 1 is a perspective view illustrating the invention in use. Fig. 2 is a side elevation of a portion of the meat holding or gripping device. Fig. 3 is a detail side elevation showing the manner of mounting the gripper carrying frame on the saw block. Fig. 4 is a vertical cross section on the line 4—4 of Fig. 2. Fig. 5 is a detail view of the finger engaging bell crank and its connection with the dog releasing rod.

In the drawings in which like numerals and letters of reference indicate like parts in all of the figures, 61 designates the meat which is laid on the block 56 and held in position to be sawed, by a mechanism for gripping the bone 62 and holding the meat on the block as indicated in Fig. 1.

To the block 56, I place a socket 63 in which the lug 65 of the rack segment 64 is adjustably held by a set 66. The rack segment 64 has a stop 67 against which the downwardly projecting portions 69 of the clamp carrying frames 70 engage, to limit the pivotal movement of the frame in one direction. The members 69 are pivoted at 68 to the rack segment 64 and the frame 70 at its forward end has a handle 71.

Mounted over the rack segment 64, in the downwardly projecting side portions 69 of the frame 70, is a dog shaft 72 that carries a dog 73 to engage the ratchet face of the segment 64, and the shaft 72 has a lever 74 to which the dog releasing rod 75 is pivoted. The rod 75 extends along the frame 70 to a position adjacent to the handle 71, where its end 78 passes through an eye 79 in the bell crank lever 76 that is pivoted at 77 to the front of the frame 70. The dog 73 is held in engagement with the rack 64 by a spring 88 that continuously tends to move the rod 75 in the direction of the arrow in Fig. 3.

Mounted slidably in the frame 70 is the gripper device which includes front and back cross bars 81, having grooved ends 82 to receive the side bars of the frame 70, the cross bars 81 being connected together by a substantially U-shape yoke 83. The bars 81 are also joined by longitudinal bars 84 that are spaced apart to receive the gripping knives 97, which are pivoted at 96 between the bars 84, at each side of the central bearing standards 85, in which a cross shaft 86 is journaled, and on which the operating levers 87 and 88 are pivoted. The levers 87 each control a pair of knives 97, the one controlling a pair at one side and the other lever controlling a pair at the other side of the apparatus, as best indicated in Figs. 2 and 4.

Each lever 87 has a heel 93 which is linked at 98 to the upper end 95 of one of its knives 97, while the other knife 97 of the pair is linked at 98 to its respective lever 87 above the fulcrum 86. Each lever 87 has a hand engageable lateral projection 89, and a pair of lugs 90, in which is journaled a screw 91, that is adapted to clamp against the curved yoke portion 83 when the handle 92 of the screw is turned. Each lever 87 has a groove to receive the curved portion of the yoke 83.

94 designates the bearings of the levers 87 on the shaft 86.

The knives 97 it will be noted, where they extend below the frame 70, are sharpened and pointed to rapidly penetrate and cut the meat.

In the use of my invention the operator grasps the handle 71, and by engaging the finger portion of the lever 76 releases the dog 73 to swing the frame 70 up out of the way. He now puts the meat 61 on the block, releases the levers 87 by releasing the screws 91, and swings them to the dot and dash position of Fig. 2, after which he presses down on the handle 71 to cause the knives 97 to penetrate the meat 61 at each side of the bone. The operator next moves the levers 87 from the position shown in dot and dash lines in Fig. 2 toward the position shown in dotted lines in the same figure, thereby causing the knives 97 to cut through the meat and grip the bone 62. In this manner the meat 61 is held in a constant position in the block 56.

This application is a divisional part of my copending application, filed August 4, 1911, Serial #642372, and the invention is particularly for use in connection with the meat sawing machine that forms the subject matter of said original application.

From the foregoing description taken in connection with the accompanying drawings, it is believed the complete construction, operation and advantages of the invention will be apparent to those skilled in the art, and I desire it understood that changes in the mechanical details of construction may readily be made by those skilled in the art without departing from the spirit of the invention.

What I claim is:—

1. A meat holding device comprising in combination with the cutting block, a rack segment mounted on said block, a carrying frame pivotally mounted to said segment, a dog carried by said frame for engaging the ratchet teeth of said segment to hold said frame in position, operator controlled means for releasing said dog, and a meat gripping device carried by said frame.

2. A meat holding device comprising in combination with the cutting block, a rack segment mounted on said block, a carrying frame pivotally mounted to said segment, a dog carried by said frame for engaging the ratchet teeth of said segment to hold said frame in position, operator controlled means for releasing said dog, and a meat gripping device carried by said frame, said meat gripping device comprising a sliding carriage, a set of knives mounted on said carriage, and lever actuated devices for moving said knives toward and from each other to grip the bone of the meat.

3. In a meat holding device, the combination with the cutting block, of a rack segment mounted thereon, a guide frame pivotally mounted on said rack segment, dog devices carried by said frame for engaging said rack segment to hold said frame in position, a sliding carriage mounted in said frame, two pairs of knives pivotally mounted on said carriage and mounted one pair in advance of the other, lever devices mounted on said carriage and connected to said knives for effecting their pivotal movement, means mounted on said levers for engaging said carriage to lock said knives from pivotal movement, all being arranged, that said knives may be swung toward one another to grip a meat bone when inserted into the meat.

4. A meat holding device comprising the combination with the meat-block, of a rigid swingable frame secured thereto, and adapted to be swung over the meat in a vertical plane, a gripper and including gripping members carried by said frame for entering the meat and clasping and gripping the bone, and devices for holding the frame in its adjusted positions.

5. A meat holding device comprising a rack segment and means for rigidly securing it to a suitable support, a carrying frame pivoted on a horizontal axis to said segment to swing in a vertical plane, a dog carried by said frame for engaging the teeth of said segment to hold said frame down on the meat, operator controlled means for releasing said dog, and a meat gripping device carried by said frame.

6. A meat holding device comprising a rack segment and means for rigidly securing it to a suitable support, a carrying frame pivoted on a horizontal axis to said segment to swing in a vertical plane, a dog carried by said frame for engaging the teeth of said segment to hold said frame down on the meat, operator controlled means for releasing said dog, and a meat gripping device carried by said frame, said meat gripping device comprising a sliding carriage, a set of knives mounted on said carriage, and lever actuated devices for moving said knives toward and from each other to grip the bone of the meat.

7. In a meat holding device, a suitable support, a carrying frame mounted on said support, a meat gripping device carried by said frame, said meat gripping device comprising a carriage slidable along said frame, a set of knives pivotally mounted on said carriage, and a lever actuated device for moving said knives toward and from each other on their pivots to grip the bone of the meat.

8. In a meat holding device, a suitable support, a carrying frame mounted on said support, a meat gripping device carried by said frame, said meat gripping device comprising a carriage slidable along said frame, a set of knives pivotally mounted on said carriage, and a lever actuated device for moving said knives toward and from each other on their pivots to grip the bone of the meat, and means for securing said lever actuated devices to hold said knives in any desired position.

GEORGE THOMAS FRANCISCO.

Witnesses:
DANIEL D. YARNELL,
JAMES H. PAINTER.